J. S. FAGLEY.
Machine for Cutting Match-Sticks.

No. 169,246. Patented Oct. 26, 1875.

Witnesses,
Harry Smith
Thomas McIlvain

John S. Fagley
by his Att'ys
Howson and Son.

UNITED STATES PATENT OFFICE.

JOHN S. FAGLEY, OF PHILADELPHIA, PENNSYLVANIA, ASSIGNOR TO HIMSELF AND EPHRAIM K. SMITH, OF SAME PLACE.

IMPROVEMENT IN MACHINES FOR CUTTING MATCH-STICKS.

Specification forming part of Letters Patent No. 169,246, dated October 26, 1875; application filed March 20, 1873.

*To all whom it may concern:*

Figure 1:
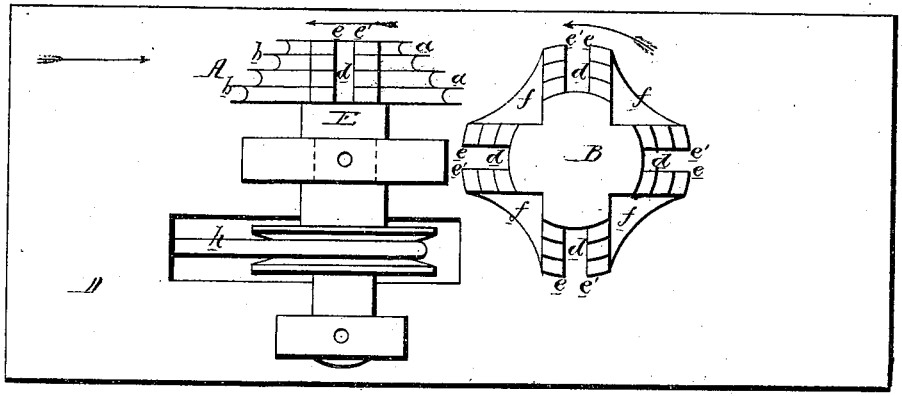
Figure 1:
Figure 2:
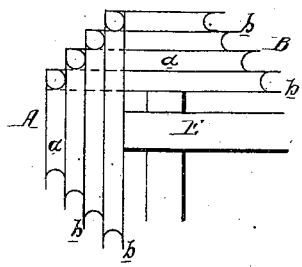
Figure 3:
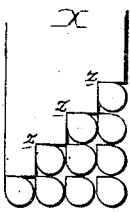

Be it known that I, JOHN S. FAGLEY, of Philadelphia, Pennsylvania, have invented Improvements in Machines for Cutting Match-Sticks, of which the following is a specification:

The object of my invention is to cut a number of round, or nearly round, match-sticks simultaneously from a block of wood; and I attain this object by combining two conical grooved cutters, A and B, rotating in planes at right angles to each other, as shown in the plan view, Figure 1, and edge view, Fig. 2, of the accompanying drawing, and arranged one directly in advance of the other, with their cutting-edges in such relation that on passing a block of wood, X, over the same, the rounded edges of the first cutter shall penetrate the wood in one direction, while those of the second cutter shall form a series of transverse cuts, crossing the first at right angles, and thus sever a row of match-sticks from the block, of the round, or nearly round, sectional form shown in the diagram, Fig. 3.

The character of the cutters is clearly illustrated in Figs. 1 and 2. Each consists of a cone having edges or sides inclined at an angle of forty-five degrees, or thereabout, and in this inclined portion are cut a series of deep circular parallel grooves, *a*, having a semicircular sectional form, and arranged so closely together that the divisions *b* between the same shall be reduced to knife-edges. Each cutter has as many of these grooves as there are match-sticks to be cut simultaneously, and the required abrupt cutting-edges are formed by means of radial grooves *d*, of which there are four in the present instance in each cutter.

If desired, the cones may be still further reduced by cutting away the portions *f* of the same between the cutting-edges, as this will reduce the friction upon the wood without destroying the efficacy of the cutter.

The cutters are shown in the present instance as mounted upon a frame, D, the cutter A being secured to a horizontal shaft, E, driven by a belt, *h*, while the cutter B is secured to a vertical shaft, also driven by a belt, both cutters rotating at a uniform speed in the direction indicated by the arrows.

The cutter A rotates in a vertical plane, and the cutter B in a horizontal plane, their cutting-edges overlapping each other, as best observed in the edge view, Fig. 2, so that when the block X is fed forward, by any suitable feed mechanism, in a direct line, it is presented, first, to the cutter A, and then to the cutter B. The edges of the former will penetrate and half sever the sticks from the block, while the edges of the cutter B, penetrating at right angles to the first, will cross the series of cuts already made, and thus completely sever the match-sticks from the blocks.

Figure 4:
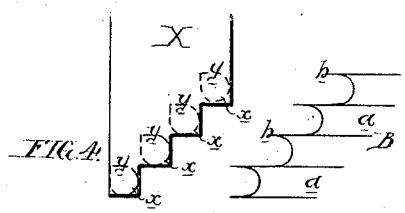
Figure 4:
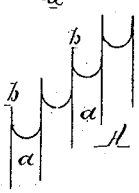

This operation will be clearly understood on reference to the diagram, Fig. 4, which represents the two cutters separately, and the block to be operated upon by the same. The block is shown as it appears after a series of sticks have been cut from it, its lower edge being beveled to a general angle of forty-five degrees, and having a series of steps formed upon it by the cutters.

In feeding the block to the latter, the cutter A first penetrates and rounds the lower edges of the steps, as indicated by the dotted lines *x*, and the cutter B next penetrates and rounds the sides of the steps, as indicated by the dotted lines *y*, the two cuts crossing each other, and severing as many sticks from the block as the cutters have grooves, the sticks being round, except at the inner corner *z*, Fig. 3, which is unavoidably left square; but this is hardly noticeable in an object of such small diameter as a match-stick.

The width of the cutters may be increased, so as to adapt the same for cutting any required number of sticks simultaneously, and, instead of feeding the blocks to the cutters, the former may be stationary, and the cutters arranged to move beneath the same.

I claim—

A machine for cutting match-sticks, in which two rotary cutters, A and B, are arranged in respect to and operate in conjunction with each other, substantially in the manner described.

In testimony whereof I have signed my name to this specification in the presence of two subscribing witnesses.

JOHN S. FAGLEY.

Witnesses:
　WM. A. STEEL,
　HUBERT HOWSON.